(12) United States Patent
Smith

(10) Patent No.: US 8,487,197 B2
(45) Date of Patent: Jul. 16, 2013

(54) REMOVABLE PUSH ELECTRICAL FITTING FOR ELECTRICAL METALLIC TUBING OR EMT HAVING IMPROVED PULLOUT RESISTANCE

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 47 days.

(21) Appl. No.: 13/308,217

(22) Filed: Nov. 30, 2011

(65) Prior Publication Data

US 2012/0068456 A1 Mar. 22, 2012

Related U.S. Application Data

(63) Continuation-in-part of application No. 12/854,783, filed on Aug. 11, 2010, now Pat. No. 8,274,000.

(51) Int. Cl.
*H02G 3/08* (2006.01)

(52) U.S. Cl.
USPC ........... 174/665; 174/662; 174/552; 174/659; 174/650; 439/271; 248/56

(58) Field of Classification Search
USPC ................. 174/665, 662, 663, 552, 557, 659, 174/650; 439/271, 277; 248/56; 403/197
See application file for complete search history.

(56) References Cited

U.S. PATENT DOCUMENTS

| | | | |
|---|---|---|---|
| 1,809,582 A | 6/1931 | Church | 285/340 |
| 1,822,056 A | 9/1931 | Noble | 285/340 |
| 2,255,673 A | 9/1941 | McDermett | 285/382.7 |
| 2,448,888 A | 9/1948 | Dibrell | 285/323 |
| 3,858,151 A * | 12/1974 | Paskert | 439/98 |
| 3,995,897 A | 12/1976 | Paskert | 285/340 |
| 4,012,578 A * | 3/1977 | Moran et al. | 174/51 |
| 4,073,514 A * | 2/1978 | Pate | 285/149.1 |
| 4,123,090 A | 10/1978 | Kotsakis et al. | |
| 4,181,329 A | 1/1980 | Helm | 285/3 |
| 4,819,974 A | 4/1989 | Zeidler | 285/373 |
| 4,885,429 A | 12/1989 | Schnittker | 174/668 |
| 5,284,582 A | 2/1994 | Yang | |
| 5,695,224 A | 12/1997 | Grenier | |
| 6,334,634 B1 | 1/2002 | Osterkil | |
| 6,335,488 B1 | 1/2002 | Gretz | |
| 6,352,439 B1 | 3/2002 | Stark et al. | |
| 6,450,550 B1 | 9/2002 | Cornwell | |
| 6,464,266 B1 | 10/2002 | O'Neill et al. | |
| 6,517,124 B1 | 2/2003 | Le Quere | |
| 6,663,145 B1 | 12/2003 | Lyall, III et al. | |
| 6,670,553 B1 | 12/2003 | Gretz | |
| 6,682,355 B1 | 1/2004 | Gretz | |
| 6,765,143 B2 | 7/2004 | Kiely | |
| 6,913,292 B2 | 7/2005 | Snyder, Sr. et al. | |

(Continued)

*Primary Examiner* — Dhirubhai R Patel
(74) *Attorney, Agent, or Firm* — Fattibene and Fattibene LLC; Paul A. Fattibene

(57) ABSTRACT

An electrical fitting having a gripping device with a plurality of gripping tabs forming a helix or spiral. The gripping tabs have a twist creating increased pullout resistance and easier disassembly. The electrical fitting permits electrical metallic tubing or EMT to be quickly attached to and removed from the electrical fitting without disassembling the fitting or cutting the tubing. A body with a locking end having a plurality of griping tabs receives an end of the tubing pushed into the fitting. The gripping tabs securely hold the tubing preventing loosening or removal. The helix or spiral and twist formation of the griping tabs permits easy removal of the tubing by rotating the tubing counter-clockwise.

19 Claims, 6 Drawing Sheets

U.S. PATENT DOCUMENTS

| | | | |
|---|---|---|---|
| 6,988,746 B2 | 1/2006 | Olson | 285/151.1 |
| 7,032,368 B2 * | 4/2006 | Funk et al. | 56/202 |
| 7,390,027 B2 | 6/2008 | Keily | 285/151.1 |
| 8,097,819 B2 * | 1/2012 | Su | 174/665 |
| 2005/0194785 A1 | 9/2005 | Shemtov | 285/382.7 |

* cited by examiner

REMOVABLE PUSH ELECTRICAL FITTING FOR ELECTRICAL METALLIC TUBING OR EMT HAVING IMPROVED PULLOUT RESISTANCE

RELATED APPLICATION

This application is a continuation-in-part of application Ser. No. 12/854,783 filed Aug. 11, 2010 now U.S. Pat. No. 8,274,000.

FIELD OF THE INVENTION

The present invention relates in general to an electrical fitting, and more particularly to a push fitting, connector, or coupler for attaching electrical metallic tubing or EMT that is easily removable without disassembly of the fitting.

BACKGROUND OF THE INVENTION

There are many electrical fittings and connectors that are used in construction. Pipes or tubing have been used to contain conductors or electrical wires. The pipes or tubing containing electrical wires are connected to electrical boxes through electrical fittings, such as connectors or couplers. Often electrical metallic tubing is used, much like pipe, to act as a conduit through which electrical wires or conductors are run. Due to the large number of connections typically made with electrical wires in construction, there is a need for an easy to use fitting, connector, or coupler for connecting tubing to an electrical box or coupling two tubes together. Accordingly there are many devices that are used to connect or couple tubing, with each connector or coupler having some particular advantage.

One such connector is disclosed in U.S. Pat. No. 3,312,483 entitled "Pipe Connector" and issuing to Ledbetter et al on Apr. 4, 1960. Therein disclosed is a pipe connector using a ring provided with a series of radially and axially extending slits which define a plurality of tabs. The tabs swing inwardly, thus biting into the plastic pipe.

Another pipe fitting is disclosed in U.S. Pat. No. 4,073,514 entitled "Combination Pipe Fitting and Retainer Ring" issuing to Pate on Feb. 14, 1978. Therein disclosed is a retainer ring having tabs. The retainer ring is held into the fitting by a groove or recess and an anchor tab.

Another fitting is disclosed in U.S. Pat. No. 6,670,553 entitled "Snap Engagement Electrical Fitting for EMT" issuing to Gretz on Dec. 30, 2003. Therein disclosed is a fitting that provides a snap-in engagement with electrical metallic tubing. A plurality of locking tangs are lanced longitudinally and bent inwardly. Arcuate edges on the leading ends of the locking tangs dig into the outer surface of the electrical metallic tubing thereby holding it fast to the trailing end of the connector.

Yet another fitting is disclosed in U.S. Pat. No. 6,913,298 entitled "Mechanical Pipe Coupling Derived from a Standard Fitting", and issuing to Snyder, Sr. et al on Jul. 5, 2005. Therein disclosed is a retainer having a plurality of radial teeth angularly oriented to engage a pipe and prevent its removal from the coupling.

While all of these fittings or connectors have performed well in permitting the inserting of a pipe or tubing that is relatively securely held, they have not permitted easy removal of the pipe or tubing should it be desired to uncouple the pipe or tubing. Generally, once these connectors have been assembled, if a change or modification is required, the pipe or tubing cannot be removed without cutting the tubing or disassembling the fitting. This is often a time consuming and difficult process which makes any subsequent modification of the configuration of the pipe or tubing difficult.

Therefore, there is the need for a simple, easy to use electrical fitting, connector, or coupler in which electrical metallic tubing may be simply pushed into the connector or coupler with the electrical metallic tubing being securely held and yet that permits easily removable of the electrical metallic tubing from the fitting, connector, or coupler when desired.

SUMMARY OF THE INVENTION

The present invention permits easy assembly of electrical metallic tubing used for running wire or conductors for making electrical connections that can be assembled by simply pushing the electrical metallic tubing into the fitting, connector, or coupler and yet that is easily removable without disassembling the fitting, connector, or coupler. The present invention is an electrical fitting comprising a connector body having a gripping device securely held therein. The gripping device has a plurality of gripping tabs that are arranged along a helix or spiral. The gripping tabs are of equal lengths and are equally spaced along a circle and originate from a ramp. The gripping tabs are positioned along the ramp at a different position relative to the longitudinal axis of the connector body of the fitting, connector, or coupler. The gripping tabs flex away from an opening in the fitting permitting the electrical metallic tubing to be pushed into the fitting through the opening. The angled gripping tabs prevent the electrical metallic tubing from being pulled away from the fitting. However, the helical or spiral positioning of the gripping tabs permits the electrical metallic tubing to be removed by simply twisting or turning the electrical metallic tubing. A contact rib is placed within the connector body to contact the electrical metallic tubing which improves continuity. In one embodiment a twist is applied to the angled gripping tabs. The twist preferably ranges from between six and eight degrees relative to the plane of a flat rim of the gripping or locking device.

Accordingly it is an object of the present invention to provide an easy to use fitting or connector for use with electrical metallic tubing that can securely hold the electrical metallic tubing and yet be readily removable without disassembling the fitting or cutting the electrical metallic tubing.

It is another object of the present invention to provide good electrical continuity and to provide a relatively low voltage drop across the electrical fitting, connector, or coupler.

It is an advantage of the present invention that the electrical metallic tubing may be simply pushed into the electrical fitting, connector, or coupler.

It is another advantage of the present invention that the electrical metallic tubing is securely held and yet is easily removed from the electrical fitting, connector or coupler when desired.

It is yet another advantage of the present invention that the electrical metallic tubing fits tightly into the connector body despite variances in the outside diameter of the electrical metallic tubing.

It is a feature of the present invention that gripping tabs are formed along a helix or spiral.

It is another feature of the present invention that rounded corners are utilized on the highest and lowest gripping tabs.

It is yet another feature of the present invention that a contact rib is used, improving continuity between the electrical metallic tubing and the electrical fitting.

It is an object of an embodiment of the present invention to resist unintentional pullout of electrical metallic tubing.

It is another object of an embodiment of the present invention to save time in removing the electrical metallic tubing from the connector.

It is an advantage of an embodiment of the present invention that the electrical metallic tubing has high straight pull-out strength.

It is another advantage of an embodiment of the present invention that the electrical metallic tubing can be removed quickly by unscrewing.

It is a feature of an embodiment of the present invention that the gripping tabs have twist.

It is another feature of an embodiment of the present invention that the gripping tabs are hardened.

These and other objects, advantages, and features will become more readily apparent in view of the following, more detailed, description.

DETAILED DESCRIPTION OF THE PREFERRED EMBODIMENTS

Figure 1:
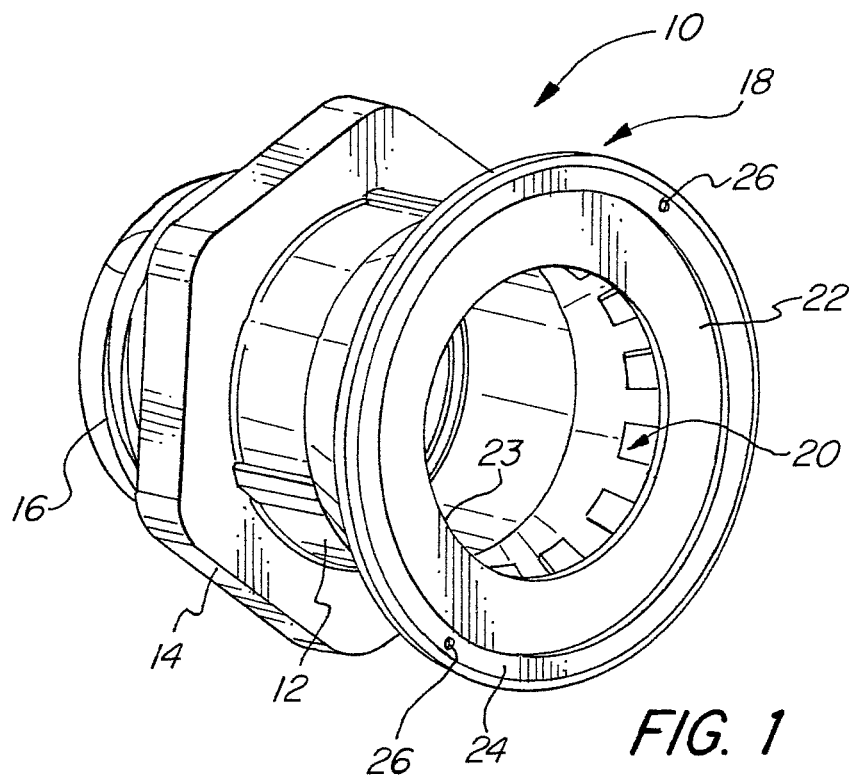
FIG. 1 is a perspective view illustrating an embodiment of the present invention.

FIG. 1 illustrates an embodiment of the present invention assembled. The electrical metallic tubing connector 10 has a generally cylindrical body 12 having a flange 14 thereon. Adjacent the flange 14 is a threaded end 16. The body 12 may be made of a zinc alloy. The gripping or locking end 18 contains a gripping or locking device 20. A washer 22 is held within the electrical metallic tubing connector 10 by crimped lip 24. Pressed within the crimped lip 24 are a plurality of dimples 26 that provide pressure to prevent the washer 24 and the gripping or locking device 20 from rotating relative to the body 12 of the electrical metallic tubing connector 10. The washer 22 has a cylindrical aperture or opening 23 therein. The diameter of the cylindrical aperture or opening 23 should be substantially the same as that of the outside diameter of the electrical metallic tubing intended to be connected. The washer 22 provides a point of support for the electrical metallic tubing.

Figure 2:
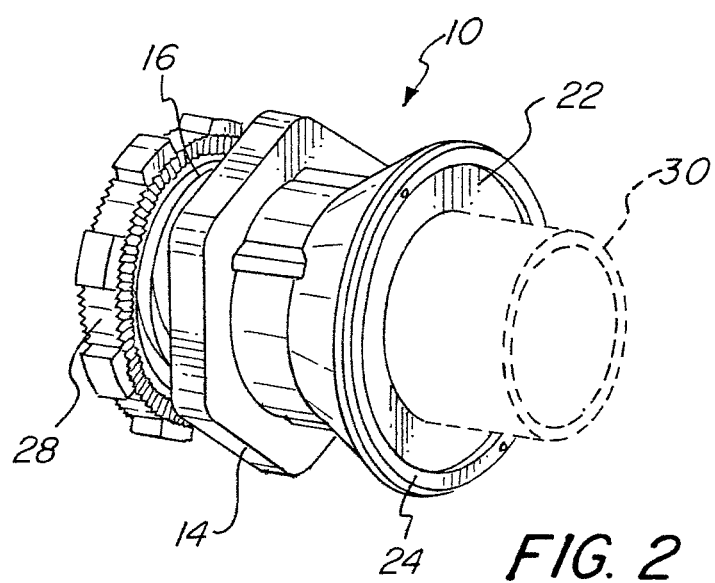
FIG. 2 is a perspective view illustrating an embodiment of the present invention with an electrical metallic tube placed therein.

FIG. 2 illustrates the electrical metallic tubing connector 10 having the electrical metallic tubing 30 inserted therein. Locknut 28 is threaded on to the threaded end 16. The threaded end 16 is typically placed within an aperture of an electrical box, not shown, with the sides of the electrical box securely held between the locknut 28 and the flange 14.

Figure 3:
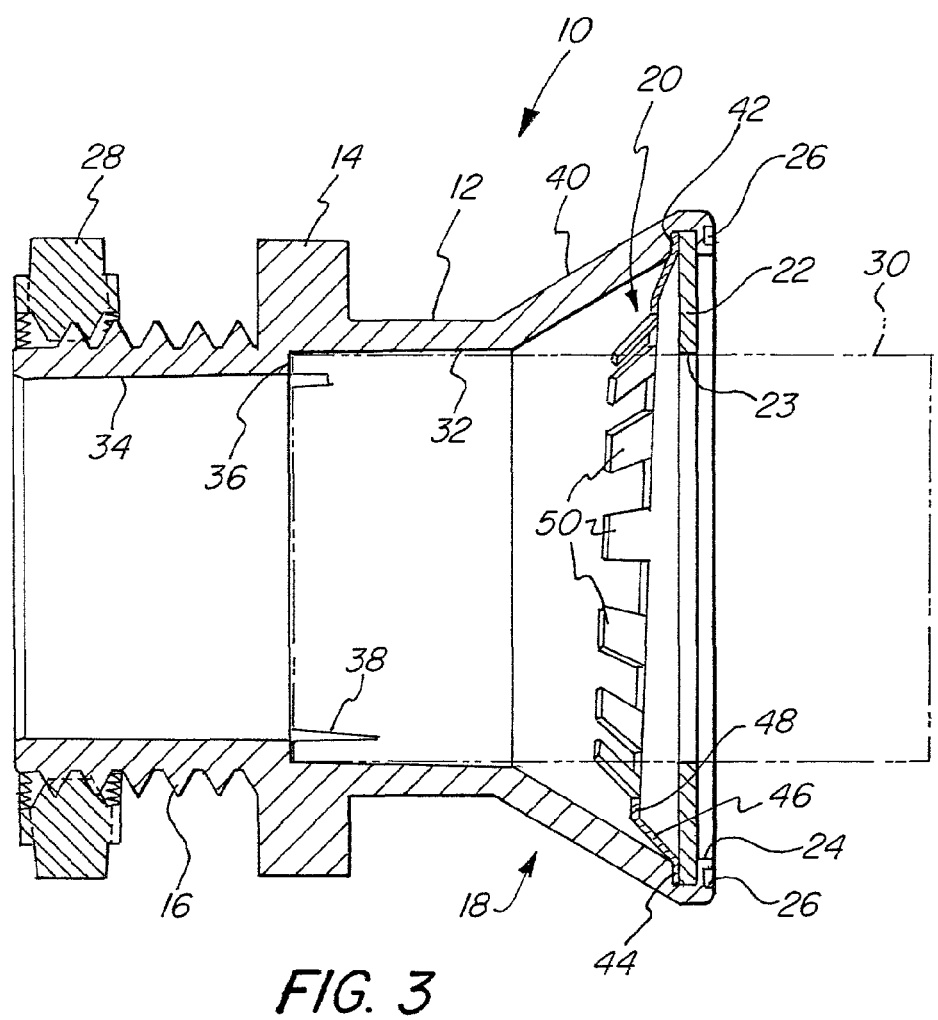
FIG. 3 is a cross-section of an embodiment of the present invention.

FIG. 3 is a cross section more clearly illustrating the construction of the electrical metallic tubing connector 10 of the present invention. The body 12 has a body bore 32 with a first diameter. The threaded end 16 has a threaded end bore 34 with a second diameter. Between the body bore 32 and the threaded end bore 34 is an intermediate shoulder stop 36. Adjacent the intermediate shoulder stop 36 is at least one contact rib 38. The contact rib 38 extends radially into the body bore 32, effectively reducing the diameter of the body bore 32 within the body 12. The contact rib 38 extends radially into the body 12 by an increasing radial dimension while progressing axially or longitudinally relative to the body 12. Preferably, there are three contact ribs equally spaced one hundred and twenty degrees apart within the body bore 32. Adjacent the body 12 is conical portion 40. Near the large open end of the conical portion 40 is a shoulder 42. The shoulder 42 is adapted to receive a flat rim 44 of the gripping or locking device 20. Attached to the flat rim 44 is a tapered angled portion 46 which is attached to a flat ramp 48 on which the gripping tabs 50 are placed. One end of the flat ramp 48 is displaced approximately two degrees (2°) from the plane of the flat rim 44. Accordingly, the flat ramp 48 has a slope or pitch of approximately two degrees (2°). The gripping tangs tabs 50 are equally spaced and have an equal length but are displaced axially relative to the longitudinal axis of the body 12 thereby forming a helix or spiral. The equal length of the plurality of gripping tabs 50 helps to uniformly hold the electrical metallic tubing. The gripping tabs 50 flex slightly and are angled inward away from the circular aperture or opening 23.

Figure 4A:
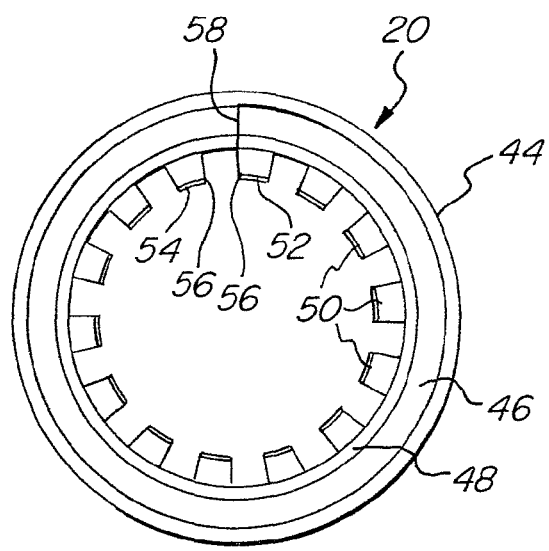
FIG. 4A is a front elevational view of a gripping or locking device utilized in the present invention.
Figure 4B:
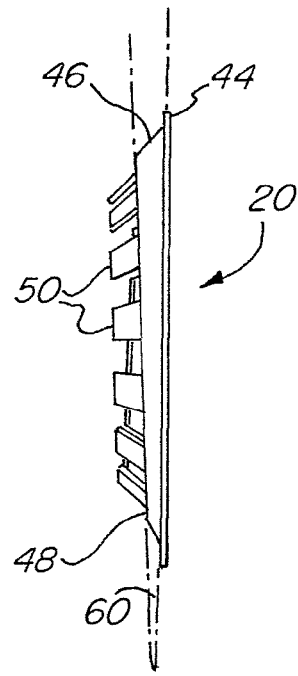
FIG. 4B is a side elevational view illustration the gripping or locking device utilized in the present invention.
Figure 4C:
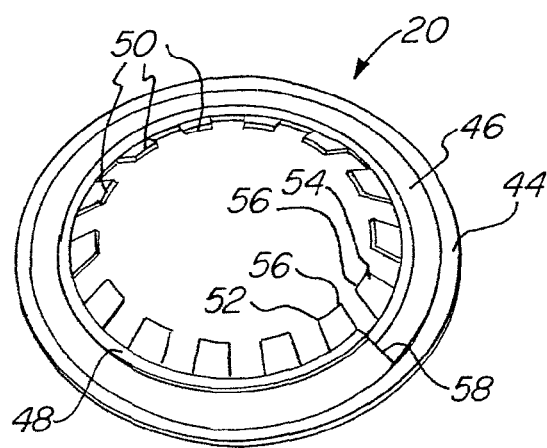
FIG. 4C is a perspective view illustrating the gripping or locking device utilized in the present invention.
Figure 4D:
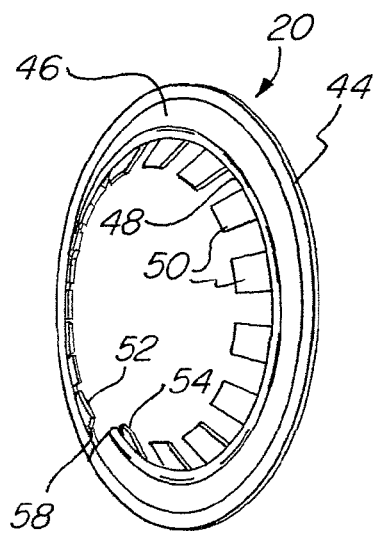
FIG. 4D is a perspective view taken at a different angle illustrating the gripping or locking device utilized in the present invention.

FIGS. 4A-D illustrate different views of the gripping or locking device 20, more clearly illustrating the positioning of the plurality of gripping tabs 50. The gripping tabs 50 are positioned or placed in a helix or spiral and are equally spaced around the inside perimeter of the gripping or locking device 20. Accordingly, there is a high end gripping tab 52 and a low end gripping tab 54 that are axially displaced and separated by edge 58. The high end gripping tab 52 and the low end gripping tab 54 have rounded corners 56 that are adjacent or facing each other. The rounded corners 56 may by shaped or have a metal cutting edge so as to cut or tap metal. As seen in FIG. 4B the flat ramp 48 is displaced by angle 60 form the flat rim 44. Angle 60 is preferably two degrees. Therefore, the helix or spiral has a pitch of approximately two degrees. The gripping or locking device 20 is preferably made of a spring metal and may be made of stainless steel, and is harder than the material of the electrical metallic tubing.

Figure 5:
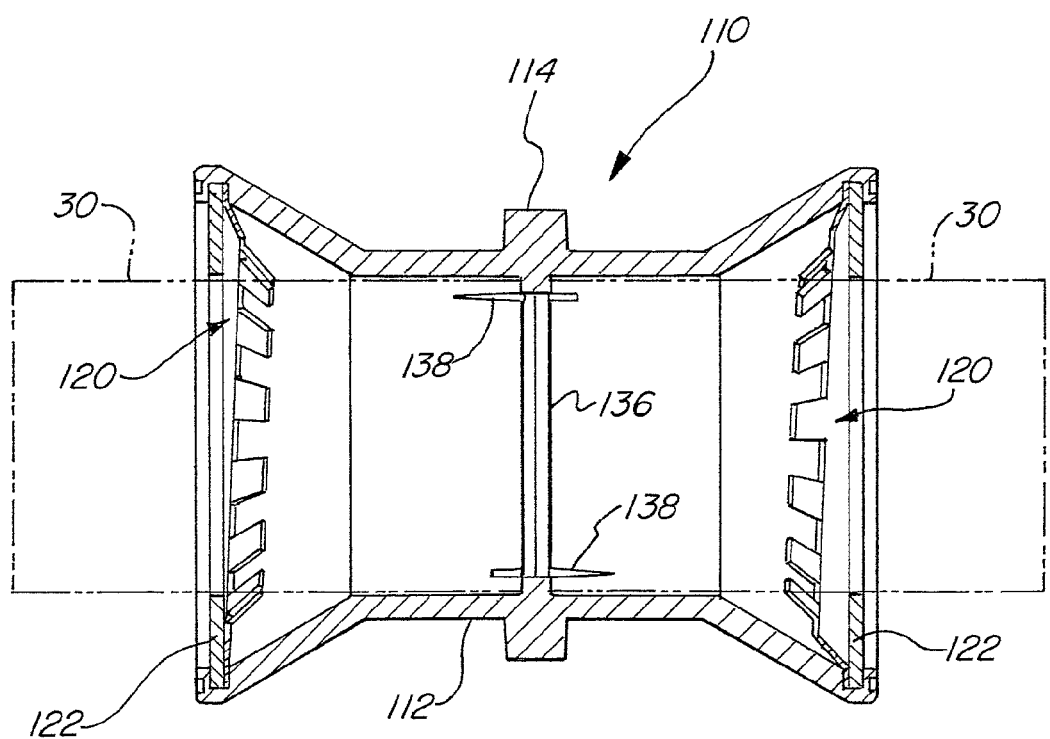
FIG. 5 illustrates a coupling embodiment of the present invention for connecting two tubes together.

FIG. 5 illustrates another embodiment of the present invention and is a coupling utilized to connect two sections of electrical metallic tubing or EMT together. The electrical metallic tubing coupler 110 has a body 112 adapted to receive a respective end of two sections of electrical metallic tubing 30. The ends of the electrical metallic tubing 30 are positioned adjacent intermediate stop 136. Adjacent intermediate stop 136 are contact ribs 138. Preferably, there are three contact ribs 138 equally spaced one hundred and twenty degrees apart within the bore of the body 112. Placed within each end of the electrical metallic tubing coupler are gripping or locking devices 120 and washers 122. The construction of each end of the electrical metallic tubing coupler is the same as that described for the electrical metallic tubing connector 10 illustrated in FIGS. 1-4D.

The operation and advantages of the present invention can readily be appreciated by referring to FIGS. 1-4D. The electrical metallic tubing connector or fitting may be pre-assembled and easily attached, in a conventional way, to an electrical box opening by inserting the threaded end 16 into an electrical box opening, not shown, and tightening locknut 28. An electrical metallic tubing 30 may then be pushed into the circular aperture 23 so that the gripping tabs 50 of the gripping or locking device 20 flex slightly inward, permitting the electrical metallic tubing to move forward, or inward, contacting the contact rib 38 and the intermediate shoulder stop 36. The contact rib 38 permits improved electrical contact or continuity between the electrical metallic tubing 30 and the body 12 of the electrical fitting or connector 10, thus reducing a voltage drop across the electrical fitting or connector 10. Additionally the contact rib 38 assures that the outer diameter of the electrical metallic tubing 30 is snugly held within the body bore 32 and adjacent the intermediate shoulder stop 36 and provides a point of contact assuring no movement or wobble of the electrical metallic tubing 30 within the body 12. The circular aperture 23 in washer 22 provides another point of contact for the electrical metallic tubing 30 that is spaced from the contact with the contact rib 38. These multiple, separated contact points assure that the electrical metallic tubing 30 does not wobble within the electrical metallic tubing connector or fitting 10. Additionally, the gripping tabs 50 prevent the electrical metallic tubing 30 from being pulled from or withdrawn from the body 12 simply by pulling longitudinally on the electrical metallic tubing 30. Therefore, the electrical metallic tubing 30 is securely held within the electrical metallic tubing fitting or connector 10 and provides a secure connection simply by pushing in the electrical metallic tubing 30 through the circular aperture 23. Therefore, the present invention provides a secure electrical fitting for dry locations, as there are no seals for weatherproofing.

Should it be necessary to disassemble or remove the electrical metallic tubing 30 from the electrical metallic tubing fitting or connector 10, this can easily be done without having to cut the electrical metallic tubing 30 or disassemble the electrical metallic tubing fitting or connector 10. Due to the gripping tabs 50 being positioned in a helical or spiral position, the electrical metallic tubing 30 can easily be removed simply by rotating the electrical metallic tubing 30, preferably counter-clockwise, causing it to follow the helical or spiral pattern of the gripping tabs, thereby forcing the electrical metallic tubing 30 to be backed out of the electrical metallic tubing fitting or connector 10. The gripping or locking device 20 is prevented from rotating by the dimples 26 placed in the crimped lip 24 and resulting pressure exerted on the washer 22 and the shoulder 42 of the gripping or locking device 20. The rounded corners 56 formed on the high and low end gripping tabs 52 and 54 may have a metal cutting edge and aid in cutting or tapping in to the electrical metallic tubing 30, essentially cutting or tapping threads so that the electrical metallic tubing 30 may be reversed out of the electrical metallic tubing fitting or connector 10 upon the electrical metallic tubing being rotated counter-clockwise. Therefore, the electrical metallic tubing 30 can be easily removed from the fitting or connector 10 without disassembling the fitting or connector 10. The electrical metallic tubing coupler 110 illustrated in FIG. 5 functions in an analogues way.

Therefore, the present invention provides a pre-assembled electrical fitting, connector, or coupler that is easily installed on an electrical box and permits an electrical metallic tubing or EMT to be securely connected to the electrical fitting without assembly or tools simply by pushing the end of the EMT into the fitting. The present invention therefore saves considerable time in not requiring time consuming assembly of the electrical fitting for each of the numerous electrical connections often required in construction. Yet should a change or different connection be required or desired the electrical metallic tubing can be easily removed from the fitting without cutting the EMT or disassembling the electrical fitting. This saves considerable time in, and therefore reduces the cost of construction advancing the electrical fitting arts.

FIGS. 6-8A illustrate another embodiment of the present invention. In this embodiment a twist is applied to the gripping tabs improving pullout resistance or strength and speed and ease of disassembly.

Figure 6:
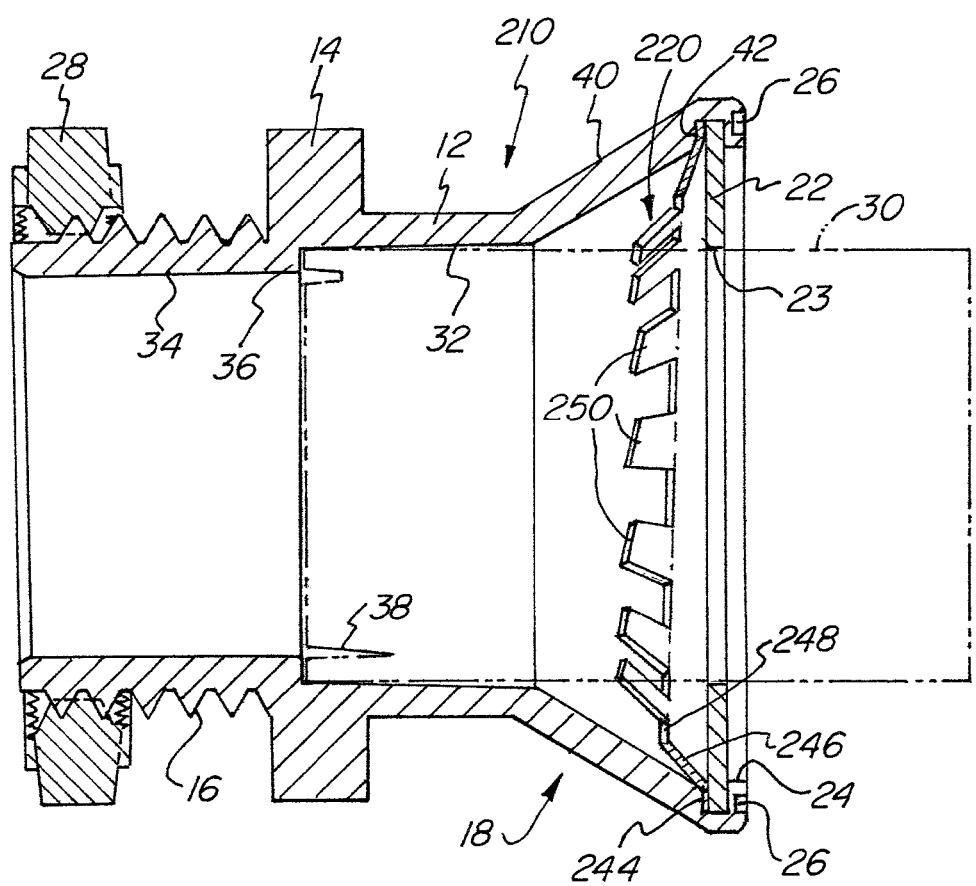
FIG. 6 is a cross-section of another embodiment of the present invention.
Figure 7A:
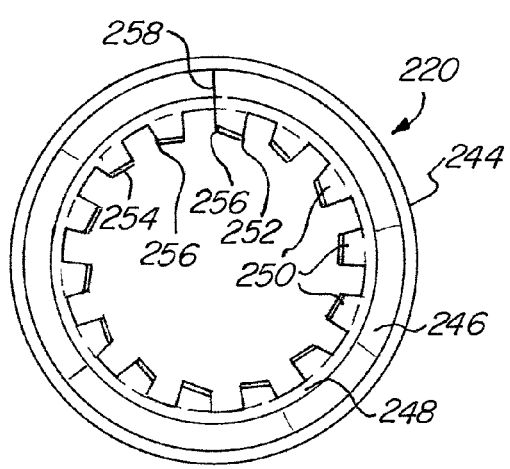
FIG. 7A is a front elevational view of a gripping or locking device utilized in another embodiment of the present invention.
Figure 7B:
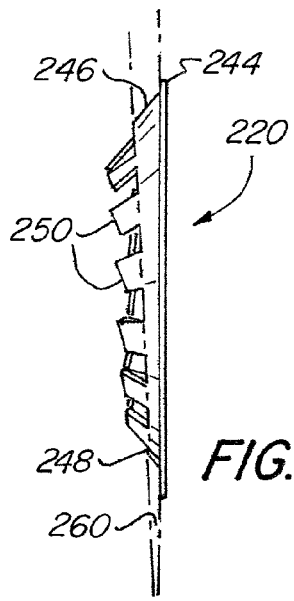
FIG. 7B is a side elevational view illustration the gripping or locking device utilized in another embodiment of the present invention.
Figure 7C:
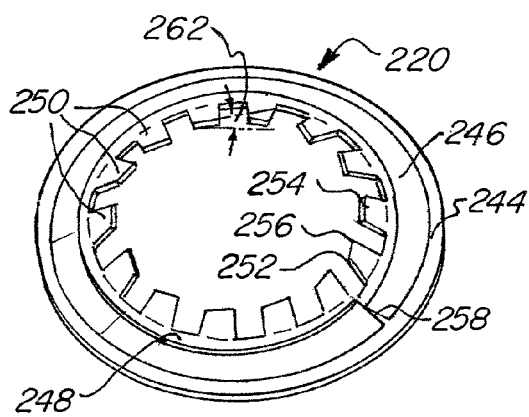
FIG. 7C is a perspective view illustrating the gripping or locking device utilized in another embodiment of the present invention.
Figure 7D:
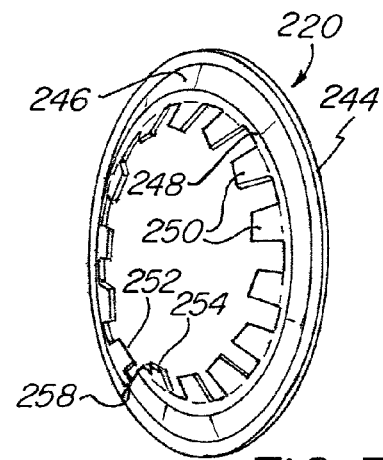
FIG. 7D is a perspective view taken at a different angle illustrating the gripping or locking device utilized in another embodiment of the present invention.

FIG. 6 illustrates a dry push electrical metallic tube connector 210 incorporating a gripping or locking device 220. The gripping or locking device 220 has a flat rim 244 in a plane. The flat rim 244 has a tapered angled portion 246 with a flat ramp 248. Attached to the flat ramp 248 are gripping tabs 250. The gripping tabs 250 have a slight twist of between six and eight degrees so that the distal ends of the gripping tabs 250 are out of the plane of the flat rim 244.

FIGS. 7A-8B more clearly illustrate the gripping locking device 220 having a twist. The gripping or locking device 220 has a flat rim 244 attached to a tapered angled portion 246 attached to a flat ramp 248. Attached to the flat ramp 248 is a plurality of gripping tabs 250. The flat rim 244, tapered angled portion 246, flat ramp 248, and plurality of gripping tabs 250 are preferably integrally formed form a single piece of metal or steel. The plurality of gripping tabs 250 are preferably made of hardened steel. The gripping tabs 250 have a slight twist of between six to eight degrees relative to the plane of the flat rim 244. FIG. 7B more clearly illustrates the helix angle 260, that is about two degrees, formed in the tapered angled portion 246 causing the distal ends of the gripping taps 250 to form a helix. FIG. 7C illustrates the twist of the gripping tabs 250 having an angle 262 relative to a plane parallel to the plane of the flat rim 244. An edge 258 splits the flat ramp 248 and tapered angled portion 246 forming a high end gripping tab 252 and a low end gripping tab 256. The high end gripping tab 252 and the low end gripping tab 256 have rounded corners 256 facing the edge 258. The rounded corners 256 help to facilitate the removal of the electrical metallic tubing from the dry push electrical metallic tubing connector 210.

Figure 8A:
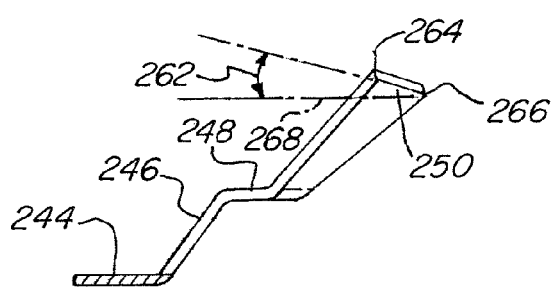
FIG. 8A is a perspective enlarged view of a portion of a gripping tab of an embodiment of the present invention.
Figure 8B:
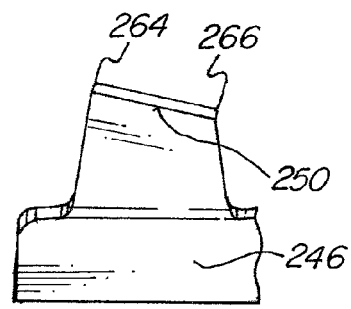
FIG. 8B is a front enlarged elevation view of a portion of a gripping tab of an embodiment of the present invention.

FIGS. 8A and 8B more clearly illustrate one of the gripping tabs 250 and the six to eight degree twist. Twist angle 262 has a base 268 that is parallel to the plane of the flat rim 244. The distal end of the gripping tab 250 forms an angle of between six and eight degrees relative to the base 268.

The twist angle 262 formed in the gripping tabs 250 has been found to greatly increase the pullout strength of the dry push electrical metallic tubing connector 210. With the twist angle 262 it is much more difficult for the electrical metallic tubing to be pulled from the connector 210. The gripping tabs 250, having the slight twist angle 262, provides additional rigidity increasing the gripping tabs 250 resistance to buckling. The increased resistance to cupping, bending, or buckling increases the force required to pullout the electrical metallic tubing form the connector 210. This provides a better more secure electrical connector.

The twist angle 262 has also been found to result in quicker disassembly by turning or rotating the electrical metallic tubing. The electrical metallic tubing can be removed from the dry push electrical metallic tubing connector 210 simply by turning or rotating the tubing counter-clockwise and unscrewing it from the connector. The twist angle 262 in the gripping tabs 250 results in the electrical metallic tubing to be more easily removed in less turns and without having to pull on the tubing during removal. This makes the electrician's or installer's work much easier, improving efficiency.

A gripping or locking device 210 having the gripping tabs 250 with a twist may also be used in a coupling for attaching two ends of electrical metallic tubing together, as illustrated in FIG. 5.

While the present invention has been described with respect to several different embodiments, it will be obvious that various modifications may be made without departing from the spirit and scope of this invention.

What is claimed is:

1. An electrical fitting comprising:
a body having a first and second end;
a locking device placed in the first end of said body; and
a plurality of gripping tabs forming a helix or spiral held in said locking device, each of said plurality of gripping tabs having a twist;
whereby a tube can be pushed into said locking device and held by said plurality of gripping tabs and the twist provides additional rigidity improving pullout resistance and the helix or spiral and the twist formation of said plurality of gripping tabs permits easy removal of the tube by rotating the tube counterclockwise.

2. An electrical fitting as in claim 1 further comprising:
an electrical box connector formed on the second end of said body,
whereby the electrical fitting can be connected to an electrical box.

3. An electrical fitting as in claim 2 wherein:
said electrical box connecter comprises a threaded end placed on the second end and a locknut.

4. An electrical fitting as in claim 1 further comprising:
a second locking device placed in the second end of said body; and
a second plurality of gripping tabs forming a helix or spiral held in said second locking device, each of said second plurality of gripping tabs having a twist;
whereby two tubes may be coupled.

5. An electrical fitting as in claim 1 further comprising:
a contact rib formed on a surface of a bore in said body and extending radially into the bore in said body by an increasing radial dimension while progressing axially or longitudinally relative to said body.

6. An electrical fitting as in claim 1 wherein:
the twist ranges from six and eight degrees.

7. An electrical connector for attaching electrical metallic tubing to an electrical box comprising:
a body having a first and second end and an aperture in the first end;
a locking device formed on the first end of said body;
a plurality of gripping tabs forming a helix or spiral with each gripping tab of the plurality of gripping tabs having a twist, said gripping device secured to said locking device;
a threaded end formed on the second end of said body; and
a locknut placed on said threaded end,
whereby an electrical metallic tubing can be pushed into said locking device and held by the plurality of gripping tabs and the twist provides additional rigidity improving pullout resistance and the helix or spiral and the twist formation of said plurality of gripping tabs permits easy removal of the electrical metallic tubing by rotating the electrical metallic tubing counterclockwise.

8. An electrical connector for attaching electrical metallic tubing to an electrical box as in claim 7 further comprising:
a contact rib formed on said body and extending radially into said body by an increasing radial dimension while progressing axially or longitudinally relative to said body towards said locking device.

9. An electrical connector for attaching electrical metallic tubing to an electrical box as in claim 7 wherein:
the helix or spiral has a pitch of substantially two degrees.

10. An electrical connector for attaching electrical metallic tubing to an electrical box as in claim 7 wherein:
the twist ranges from six to eight degrees.

11. An electrical connector for attaching electrical metallic tubing to an electrical box as in claim 7 wherein said plurality of gripping tabs further comprises:
a circular shaped flat rim adapted to be securely held within said locking device;
a tapered angled portion formed onto said flat rim;
a flat ramp formed onto to said tapered angle portion; and
wherein said plurality of gripping tabs are formed onto said flat ramp and are angled inward towards said body.

12. An electrical connector for attaching electrical metallic tubing to an electrical box as in claim 11 wherein:
the twist ranges from six to eight degrees relative to a plane of said circular shaped flat rim.

13. An electrical connector for attaching electrical metallic tubing to an electrical box as in claim 11 further comprising:
a washer having a circular aperture placed adjacent said circular shaped flat rim;
a crimp formed on said locking device holding said washer adjacent said circular shaped flat rim and said locking device; and
a dimple formed in said crimp,
whereby said washer is forced against said circular shaped flat rim and said locking device formed on said body preventing relative rotation of said plurality of gripping tabs and said body.

14. An electrical connector for attaching electrical metallic tubing to an electrical box as in claim 7 wherein:
one of said plurality of gripping tabs comprises a high end gripping tab having a rounded corner with a cutting edge.

15. An electrical connector for attaching electrical metallic tubing comprising:
a body having a threaded end with a threaded end bore having a first diameter, a body bore having a second diameter, and a conical portion forming a locking end;
an intermediate shoulder formed between the threaded end bore and the body bore;
a plurality of contact ribs formed adjacent said intermediate shoulder and extending longitudinally into said body and radially outward by increasing radial amounts progressing from said intermediate shoulder towards the locking end;
a shoulder formed on a large diameter end of the conical portion;
a locking device comprising a circular shaped flat rim abutting said shoulder, a tapered angled portion formed onto the circular shaped flat rim, a flat ramp formed onto the tapered angled portion, and a plurality of gripping tabs formed onto the flat ramp and angled inward towards said body, each of the plurality of gripping tabs having a twist;

a washer having a circular aperture sized to receive the electrical metallic tubing placed within the conical portion of said body and adjacent the circular shaped flat rim of said locking device;

a crimp formed around a circumference of the large diameter end of the conical portion, whereby said crimp holds said locking device and said washer into the conical portion of said body;

a plurality of dimples pressed into said crimp forcing said washer and the circular shaped flat rim against said shoulder formed on the large diameter end of the conical portion, whereby said locking device is prevented from rotating relative to said body; and a locknut threaded on the threaded end of said body, whereby the electrical metallic tubing can be pushed into said locking device and held by the plurality of gripping tabs with the twist providing additional rigidity improving pullout resistance and removed by rotating the electrical metallic tubing placed in the circular aperture counter-clockwise permitting easy removal of the electrical metallic tubing.

16. An electrical connector for attaching electrical metallic tubing as in claim 15 wherein:

the flat ramp forms a pitch of two degrees.

17. An electrical connector for attaching electrical metallic tubing as in claim 15 wherein:

one of the plurality of gripping tabs comprises a high end gripping tab having a rounded corner cutting edge.

18. An electrical connector for attaching electrical metallic tubing as in claim 15 wherein:

the twist ranges from between six and eight degrees relative to a plane of the circular shaped flat rim.

19. An electrical coupler for coupling two tubes comprising:

a body having a first and second end and an aperture in the first end and the second end;

a first locking device comprising a first plurality of gripping tabs forming a helix or spiral secured to the first end of said body, each of the first plurality of griping tabs having a first twist; and a second locking device comprising a second plurality of gripping tabs forming a helix or spiral secured to the second end of said body, each of the second plurality of griping tabs having a second twist, whereby a respective electrical metallic tubing can be pushed into said first and second locking devices and effectively joined, with the first and second twist providing additional rigidity improving pullout resistance and removed by rotating the respective electrical metallic tubing placed in the aperture in the first end or the second end counter-clockwise permitting easy removal of the respective electrical metallic tubing.

* * * * *